(No Model.) 9 Sheets—Sheet 1.
C. BENZ.
DRIVING GEAR FOR VELOCIPEDES.

No. 386,798. Patented July 31, 1888.

Fig. 1

Witnesses:

Inventor:

(No Model.) 9 Sheets—Sheet 2.

C. BENZ.
DRIVING GEAR FOR VELOCIPEDES.

No. 386,798. Patented July 31, 1888.

Witnesses:

Inventor:
Carl Benz (No Model.) 9 Sheets—Sheet 3.
C. BENZ.
DRIVING GEAR FOR VELOCIPEDES.

No. 386,798. Patented July 31, 1888.

Fig. 6.

Witnesses: Inventor: Carl Benz (No Model.) 9 Sheets—Sheet 4.

C. BENZ.
DRIVING GEAR FOR VELOCIPEDES.

No. 386,798. Patented July 31, 1888.

Fig. 7

Witnesses:

Inventor:
Carl Benz (No Model.)   9 Sheets—Sheet 6.

C. BENZ.
DRIVING GEAR FOR VELOCIPEDES.

No. 386,798. Patented July 31, 1888.

(No Model.) 9 Sheets—Sheet 8.

C. BENZ.
DRIVING GEAR FOR VELOCIPEDES.

No. 386,798. Patented July 31, 1888.

UNITED STATES PATENT OFFICE.

CARL BENZ, OF MANNHEIM, BADEN, GERMANY.

DRIVING-GEAR FOR VELOCIPEDES.

SPECIFICATION forming part of Letters Patent No. 386,798, dated July 31, 1888.

Application filed November 26, 1887. Serial No. 256,268. (No model.) Patented in England April 28, 1886, No. 5,789, and in France April 28, 1887, No. 175,027.

*To all whom it may concern:*

Be it known that I, CARL BENZ, a subject of the Grand Duke of Baden, and a resident of Mannheim, in the Empire of Germany, have invented certain new and useful Improvements in Driving-Gears for Wagons and Carriages, (for which I have partly obtained Letters Patent in England, No. 5,789, dated April 28, A. D. 1886, and in France, No. 175,027, dated April 28, A. D. 1887,) of which the following is a full and clear specification.

My improvements relate to the driving-gear of vehicles which are operated by a gas-motor placed on such vehicles. The gas necessary for working said motor is generated from easily-evaporating oils—such as benzine, gasoline, ligroine—and is produced in an apparatus which is also mounted on the vehicle. The apparatus I preferably employ for these vehicles is described in my application for patent dated August 15, 1887.

My improvements consist, first, in means for preventing the interruption of transmission of power from the main driving-shaft to the axle of the wheels of the vehicle. They further consist in the construction of a gearing by which it is made possible to regulate the velocity with which the rotatory power of the main driving-shaft is transmitted to the axle of the wheels without making the motor work faster or slower, so that the vehicle runs slow when mounting a steep road, but with increased driving-power, and faster with reduced power when running over a level road.

These improvements are shown in the accompanying drawings, in which—

Fig. 2 shows the main driving and the engaging and disengaging gear.
Fig. 3 is a top view of part of Fig. 2, showing a device for regulating the consumption of gas.
Fig. 4 4$^a$ is a modification thereof in side elevation.
Fig. 5 is another modification.
Fig. 6 shows the remaining part of Fig. 2 in a plan.
Fig. 10 represents the same device in a considerably enlarged horizontal section.
Figs. 10$^a$, 10$^b$, and 10$^c$ are details thereof.

The views just described are drawn to different scales for better illustrating the details of the mechanism.

Similar letters of reference indicate similar parts throughout the several views.

Figure 1:
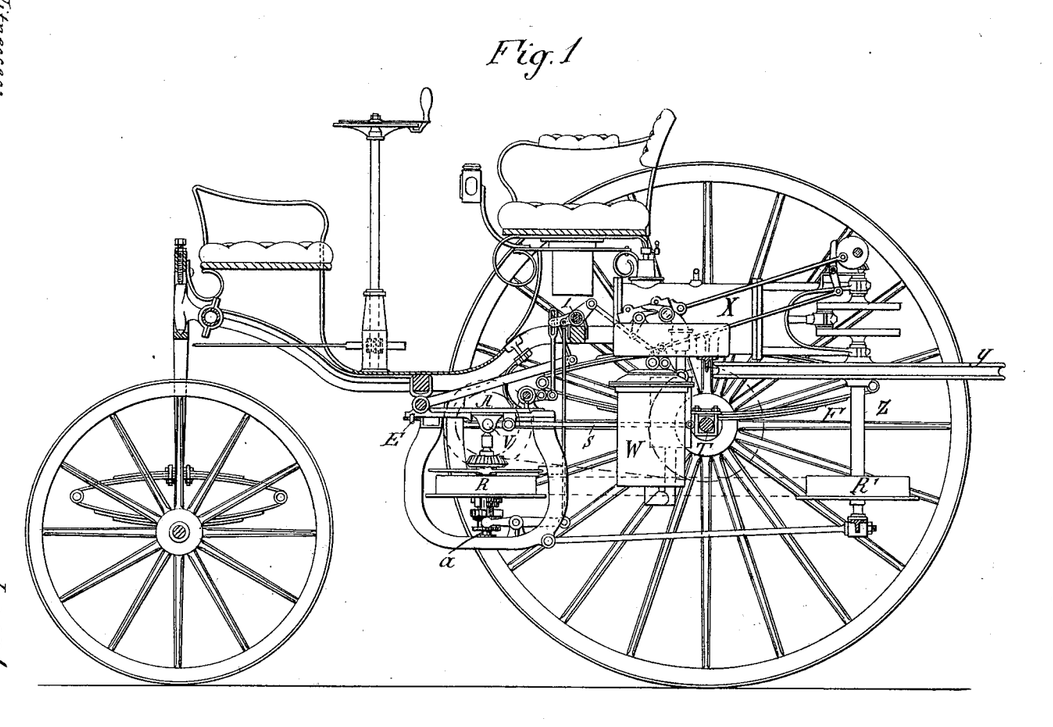
Figure 1 represents a vehicle provided with my improvements in a side elevation.

X is the working-cylinder of the gas-motor, Fig. 1, Sheet I. Its motive power is transmitted to a vertical shaft, Z, provided with a fly-wheel, Y, and pulley R'. The latter is connected by means of a suitable belt with pulley R, which is mounted loosely on shaft $a$, but is constructed to be coupled to the same by a mechanism hereinafter more fully described. The rotatory motion of shaft $a$ is transferred to the main shaft V of the driving-gear by means of beveled wheels. Shaft V carries at its ends two chain-wheels, P P, Fig. 7. On the axle of the wagon are also mounted two chain-wheels, P' P', and both pairs are connected by chains.

In order to prevent unnecessary tension on the driving-chains, the shaft V is journaled in a horizontal plane with the axle T, so that a considerable movement of the latter will only result in a slight loosening or tightening of the chain. To obviate also this small tension, the axle boxes or bearings are connected together by rods S, connecting the bearings substantially in a line between the centers of the axles V and T. By this means the axle T is caused to move substantially on an arc of the circle of which V is the center, and any strain on the chains with the jolting of the vehicles is entirely obviated. The driving-chains being also more or less stretched by the tension of driving, it is necessary to provide means for taking up the slack and bringing them again to a good working tension. The shaft V, carrying the chain-wheels P P, is therefore journaled at L L in a frame, A, which is displaceable by two set-screws, E E, in the two guides D D in a direction toward or from the axles T of the driving-wheels. To subsequently secure the frame A in the position given to it, it is fixed on each side by set-screws in the guides D D, fastened to the frame.

Figure 9:
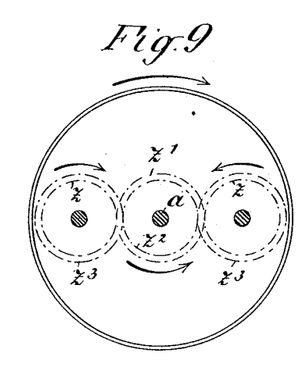
Fig. 9 shows the engaging and disengaging gear in a side view.
Figures 10, 10A, 10B, 10C:
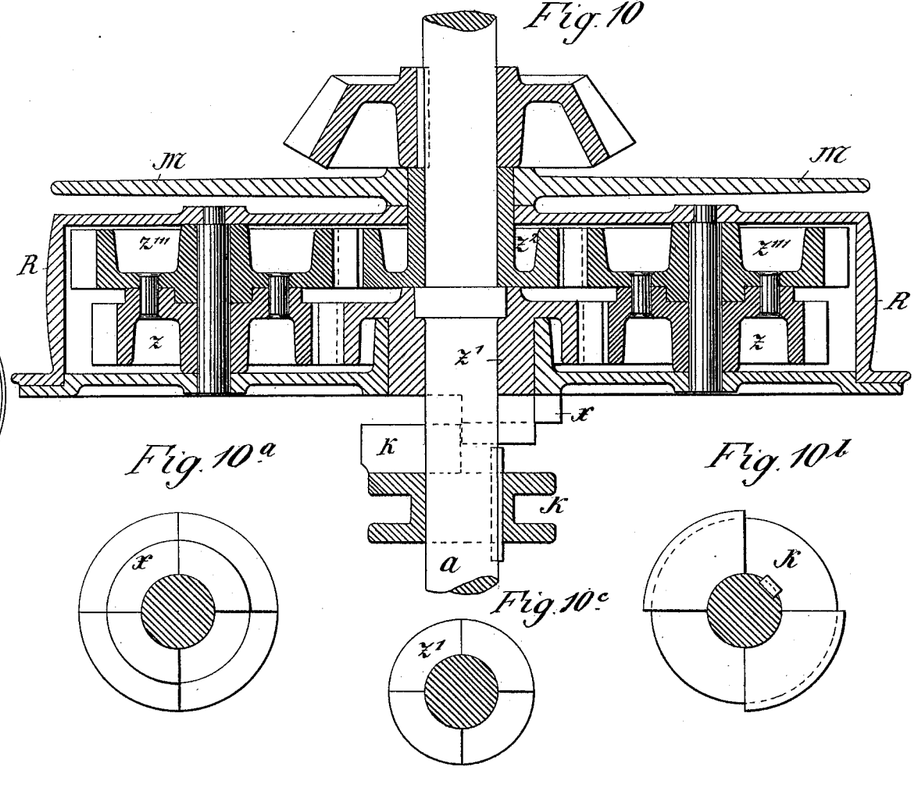
Figure 11:
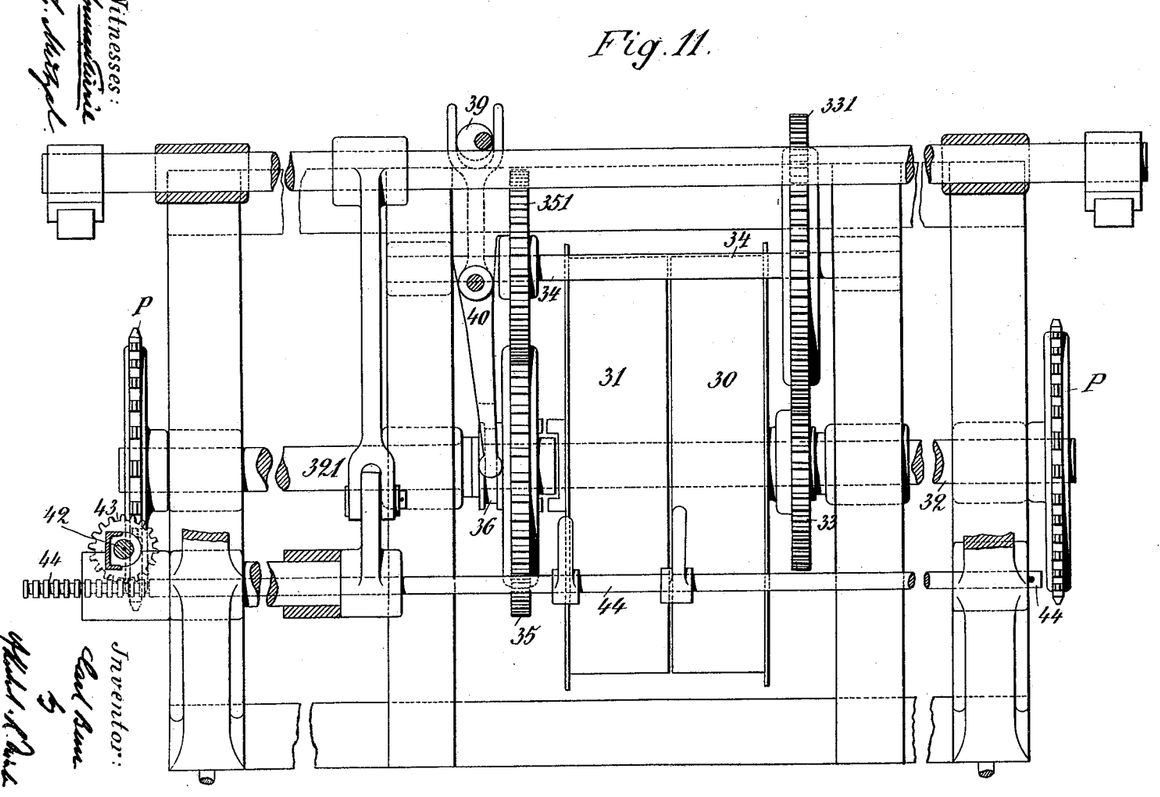
Figs. 11 and 12 show a modification of the driving-gear in a side view, partially in section, and in a top view.
Figure 12:
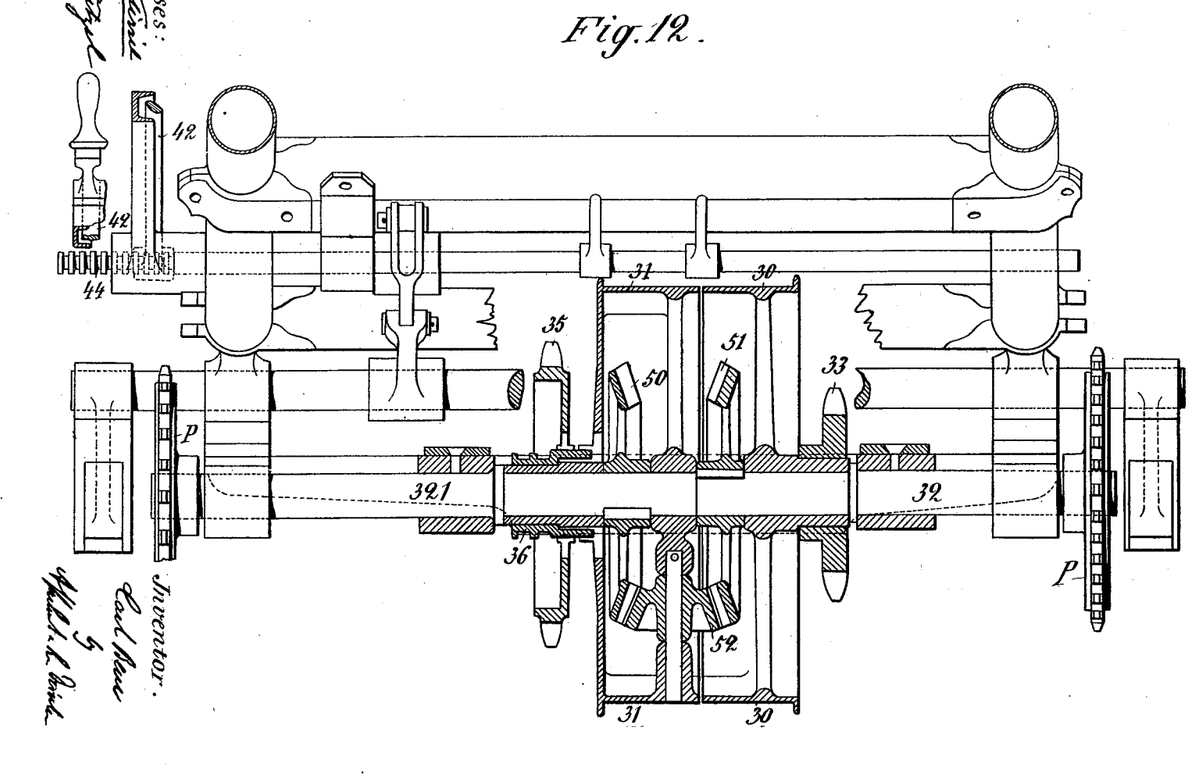

On the shaft a is provided the speed and power gear arranged in the pulley R, by means of which, while the velocity of the motor remains the same, a considerably slower travel of the vehicle, and in proportion also greater driving power may be obtained for overcoming steep gradients. The engagement and disengagement of this apparatus is effected by means of the lever 3, Fig. 2, and in such a manner that by shifting this lever forward the power-gear first comes into action for producing the greater power required for starting the vehicle. When the latter is in movement, the lever 3 is pressed still farther forward, the power-gear is disengaged, and the power is imparted direct from the motor to the bevel-wheel C of the axle V. On arriving at a steep ascent the lever 3, guided against a segment, s, is drawn back from o'' to o'. For stopping the vehicle, the lever is drawn back up to o and the motor runs free. The construction of the apparatus fulfilling these purposes is as follows, Figs. 2, 9, and 10:

The pulley R is mounted loosely on the shaft a, and when set in rotation by the belt from the motor it runs at first while the lever 3 stands at the point o loosely on the shaft a. When the lever 3 is shifted forward to o', Fig. 2—that is to say, into its central position—it shifts the clutch-coupling K, which is vertically movable on the shaft a and connected thereto by a spline upward so far only that it engages the tooth-wheel z'. At the same time also the nose N on the rod G, actuating the coupling, arrests the wing M. The latter is fixed to the tooth-wheel z''. Therefore, as long as the nose N remains in this position the tooth-wheel z'' is prevented from revolving. In the pulley R are also journaled the tooth-wheels z and z''', riveted together. The action of one pair of wheels, z z''', is the same as that of the other, and two pairs of wheels are preferably employed for insuring an equable transmission of power and avoiding as far as possible lateral pressure. The tooth-wheels z z''' being journaled on bolts fixed in the pulley R, are therefore guided therewith round the fixed tooth-wheel z'', and therefore the tooth-wheels z''' are revolved by the stationary tooth-wheel z''. The diameter of z''' is slightly larger than that of z''. Therefore z''' does not make a whole revolution on its own axis during one revolution of the pulley R. The wheel z, rigidly connected with z''', joins in the same revolution, and by gearing into z' and being slightly smaller than the latter, z' revolves slower than z. Therefore z' will revolve more slowly than R, thus giving more power though less speed to the shaft a. When the lever 3 is pressed forward from its central position, o', to o'', the nose N releases the wing M, which then revolves with the pulley R. At the same time the coupling K is shifted farther upward, so as now to engage also with the clutches of the pulley R, whereby a direct connection is produced between the pulley R and the shaft a, and the vehicle is therefore driven without the power-transmission gear and with greater speed. A modified construction of this gear is shown in Figs. 11 and 12, which is especially adapted for such wagons in which the main driving-shaft T is mounted horizontally. In this case the main shaft 32 of the gear, which is the same as V in the other figures, is provided with two pulleys, 30 and 31, of which pulley 30 is loosely mounted on said shaft. For driving the wagon slower, but with less motive power, the nave of loose pulley 30 carries a spur-wheel, 33, firmly secured to it and gearing into another one of greater diameter on shaft 34. (See Fig. 12.) On this shaft is mounted another smaller wheel, 351, which engages with a larger one, 35, on shaft 321. It must be mentioned that shafts 32 and 321 are made of two pieces.

Figure 13:
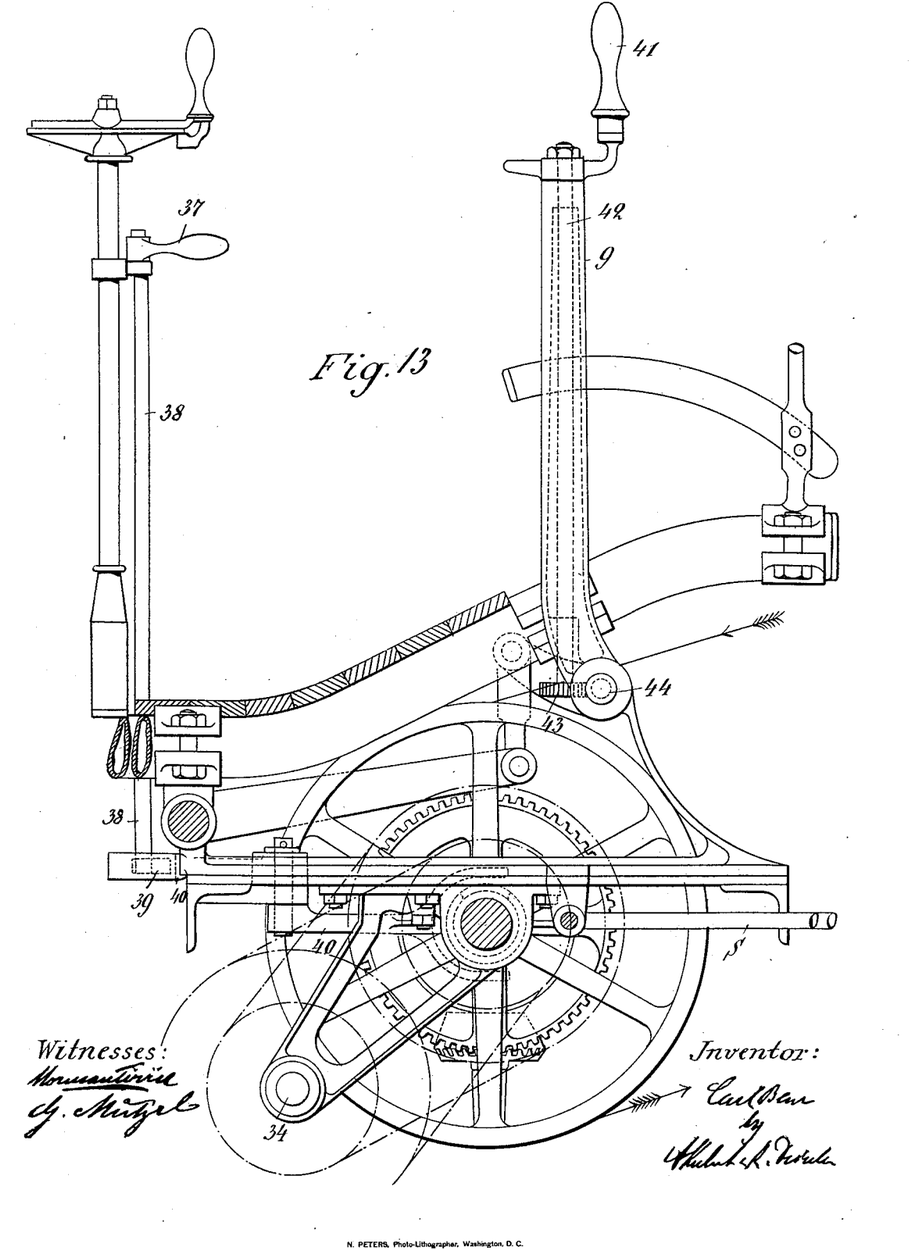
Fig. 13 shows, in a side elevation, the mechanism for braking the wagon or carriage.

Spur-wheel 35 may be made to engage and disengage with pulley 31 by means of coupling 36, which is effectuated by turning lever 37, Fig. 13, that again turns cam 39 by means of rod 38, so that lever 40 pushes the coupling 36 between the clutches of pulley 31, or removes it from the latter.

When starting the motor, the belt runs over pulley 30, and handle 37 is in that position in which coupling 36 is out of gear with wheel 31. Wheels 33 and 35 will then turn loosely upon their shafts. If it is desired to run the vehicle at full speed, the belt must be put on pulley 31. Hereby beveled wheels 50 and 51 will turn in the same direction, since wheel 52 is placed between them, and their shafts 32 and 321 are made to turn with like speed.

By mounting a steep road the belt is again pushed upon pulley 30, and the coupling is made to engage with pulley 31 by means of turning handle 37. Rotatory power is then transmitted from pulley 30 to wheels 33 and 35 and to pulley 31.

Figures 2, 3, 4, 4A, 5:
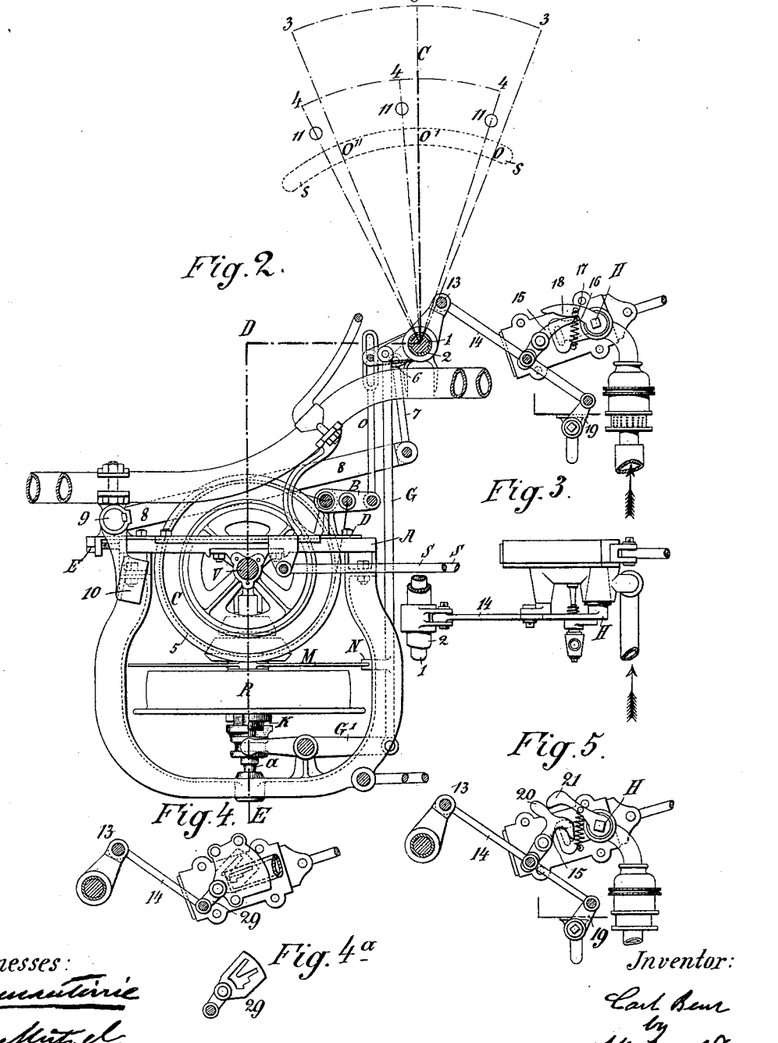
Figure 6:
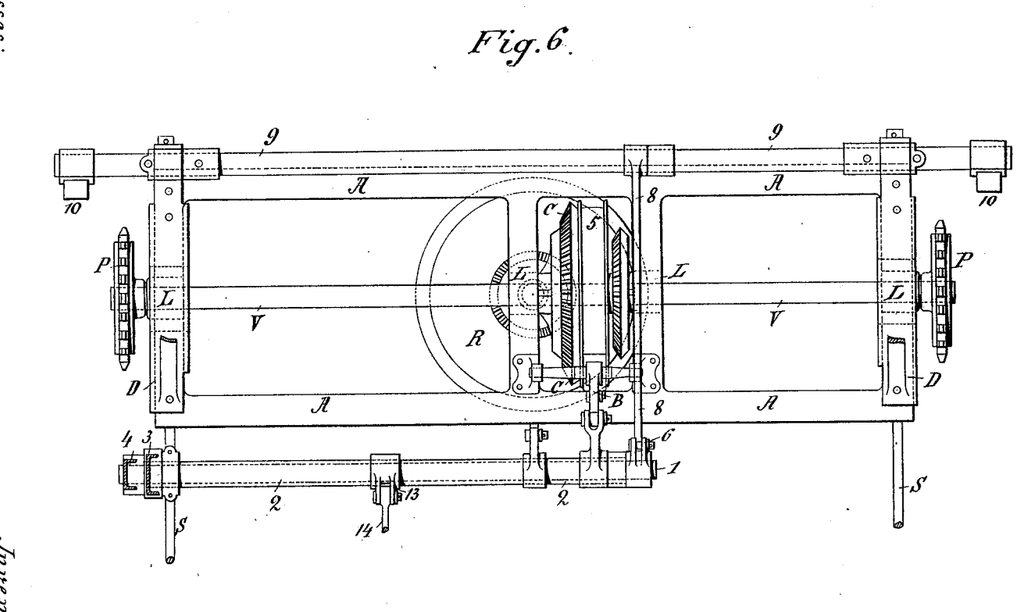
Figure 7:
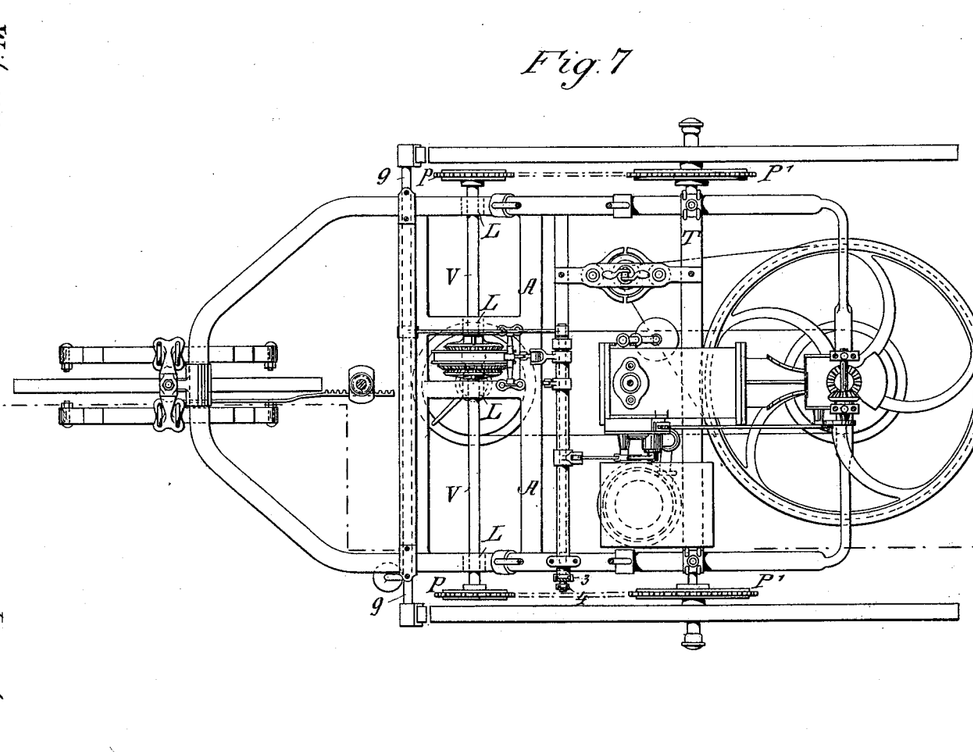
Fig. 7 illustrates the arrangement of that gear which is situated below the body of the carriage when viewed from below.
Figure 8:
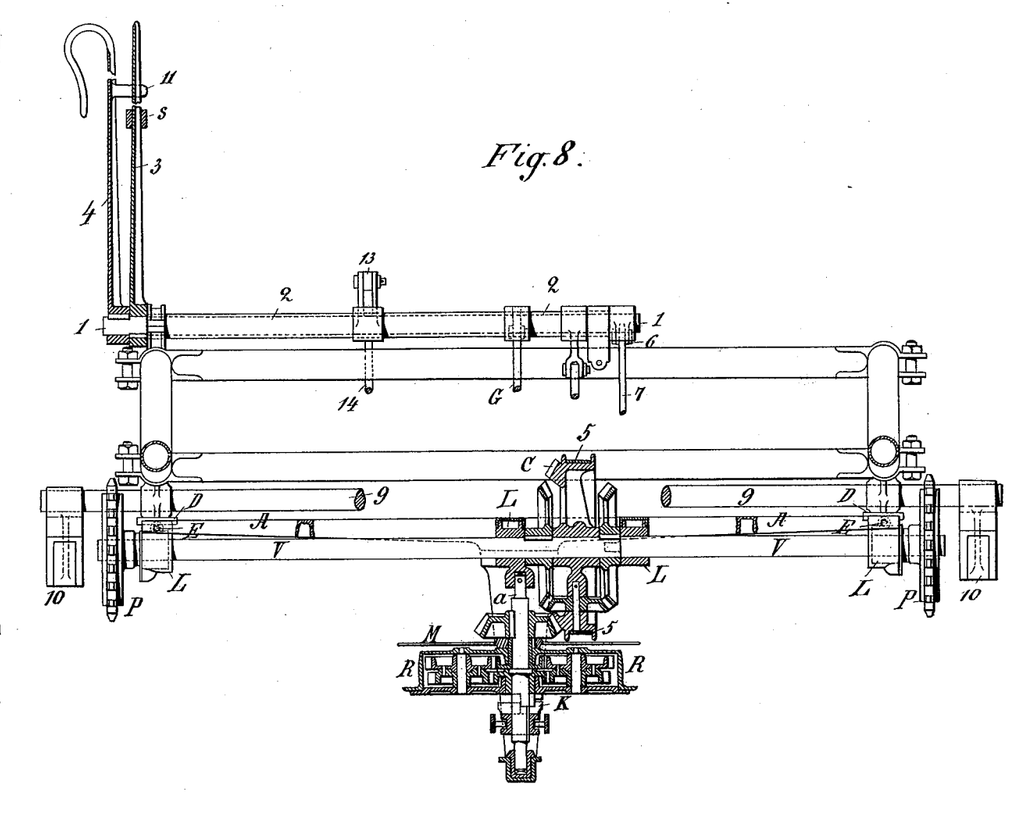
Fig. 8 is a vertical transverse section on line C D E of Fig. 2.

To insure a greater safety in the operation of the vehicle, I provide the latter with a brake actuating directly upon the wheels of the vehicle. This braking contrivance is shown in Figs. 1 and 7. Below the seat of the wagon is arranged a horizontal shaft, 1, being surrounded by a tube, 2. On the left-hand side of the person operating the vehicle, near the box, are provided two levers, 3 and 4. Lever 3, being the starting-lever, is connected to tube 2, by means of which coupling K, Fig. 2, is made to engage and disengage for driving the vehicle slower or faster. By this lever 3 it is also possible to put the brake into operation in connection with rod o and lever B. The band-brake 5 is thus drawn tight and V is made to stop. If this brake should become inoperative, lever 4 will have to be drawn up, whereby, by means of lever 6, rod 7, lever 8, and shaft 9, brake-blocks 10 10 are pressed against the wheels. For completely braking, it is necessary to use lever 4, which also puts the motive power out of operation. For this purpose I provide lever 4 with a projection, 11, that takes along lever 3 when being turned.

For operating the direct brake by the starting-lever, I have made the following arrangement. (See Figs. 11, 12, and 13.)

Handle 41 is firmly secured to rod 42 and loosely to lever 9. At the end of rod 42 is fixed a toothed wheel, 43, which enters into indentations of rod 44. Rod 44 is only axially movable, and is provided with the forked cramp for shifting the belt of the pulleys. The regulation of the speed of the motor is also accomplished by the starting-lever 3. (See Figs. 2, 3, 4, and 5.) When lever 3 is thrown back into position $o$, valve H is closed so much by lever 13, rod 14, and lever 15 that just enough gas is admitted for turning the loose pulley. When in position $o'$, lever 3 makes the coupling K enter the clutches of wheel $y'$, as already described, and at the same time valve H is opened somewhat, as lever 15 comes then on the projection 16 of the key of cock H. By throwing lever 3 into position $o''$ the coupling enters the clutch of wheel R, and lever 15 presses upon projection 18 of the key of valve H, so that the latter is fully opened.

The key of valve H is permanently drawn toward lever 15 by means of a spiral spring, as is shown. The feed-valve, which regulates the quantity of ligroine entering the gas-generating apparatus, is again regulated by rod 19, so that in proportion to the quantity of gas which is consumed by explosion the quantity of liquid for generating the gas is regulated. A modification of this regulating device is shown in Fig. 5, where in place of the projections of the key these projections are applied to a disk, 20, on lever 15, which acts upon key 21. Another modification is shown in Figs. 4 and 4ª, where there is arranged a disk, 29, which is pivoted to lever 14, and is provided with a slide that regulates the size of the opening for the gas.

By all these improvements I have attained the object in view—that is, a safe and sure working of the driving-gear of the vehicle.

Having thus fully described and explained the nature of my invention, I claim as new and desire to secure by Letters Patent—

1. In vehicles with driving-gear, the arrangement of the main driving-shaft V 32 and the axle of the vehicle in one horizontal plane, and in combination with one of these shafts connecting-rods S S on each side, for the purpose and in the manner substantially as described.

2. In vehicles with driving-gear, the main driving-shaft V, a movable frame, A, for said shaft, and the axle T, of the wheels arranged parallel to the main shaft, all substantially as described.

3. In vehicles with driving-gear, a pulley, R, spur-wheels $z\ z'\ z''\ z'''$, arranged inside pulley R, and a wing, M, in connection with lever 3, operating substantially in the manner as described.

4. In vehicles with driving-gear, a starting-lever, 3, in combination with a coupling, K, and a braking contrivance, 5, and in combination with a second lever, 4, arranged and operating substantially in the manner as described.

5. In vehicles with driving-gear, a combined regulating and braking device for regulating the admission of the liquid into the gas-generator and of the gas to the motor, and for braking the vehicle accordingly, all substantially in the manner as described.

In witness whereof I hereunto set my hand in presence of two witnesses.

CARL BENZ.

Witnesses:
CURT KÖHLER,
EUGEN HAAG.